United States Patent
Richardson et al.

[11] Patent Number: 6,052,421
[45] Date of Patent: Apr. 18, 2000

[54] METHOD FOR SEPARATING A DESIRED SIGNAL FROM AN INTERFERING SIGNAL

[75] Inventors: David Livingstone Richardson, Arlington Heights; Mark Douglas Hischke, Algonquin; Gregory Paul Richardson, Wheaton, all of Ill.

[73] Assignee: Northrop Grumman Corporation, Los Angeles, Calif.

[21] Appl. No.: 09/161,921

[22] Filed: Sep. 28, 1998

[51] Int. Cl.[7] .............................. H03D 1/04; G01S 13/00; H04M 1/00; G06F 15/00
[52] U.S. Cl. ..................... 375/346; 342/101; 379/410; 708/404
[58] Field of Search .................... 375/346–349, 375/350, 348; 342/101, 134, 196, 195, 98, 199; 379/410; 708/403, 404

[56] References Cited

U.S. PATENT DOCUMENTS

| | | | |
|---|---|---|---|
| 3,755,811 | 8/1973 | Breckman | 343/6.5 R |
| 4,079,376 | 3/1978 | Kirk, Jr. | 343/7 A |
| 4,266,279 | 5/1981 | Hines | 364/726 |
| 4,937,583 | 6/1990 | Poinsard | 342/195 |
| 5,191,347 | 3/1993 | Ishikawa et al. | 342/132 |
| 5,251,161 | 10/1993 | Gioutsos et al. | 364/578 |
| 5,345,470 | 9/1994 | Alexander | 375/1 |
| 5,374,932 | 12/1994 | Wyschogrod et al. | 342/36 |
| 5,422,912 | 6/1995 | Asser et al. | 375/350 |
| 5,457,462 | 10/1995 | Mitsumoto et al. | 342/93 |
| 5,473,332 | 12/1995 | James et al. | 342/159 |
| 5,481,270 | 1/1996 | Urkowitz et al. | 342/101 |
| 5,495,249 | 2/1996 | Chazelle et al. | 342/36 |
| 5,872,628 | 2/1999 | Erskine | 356/345 |

*Primary Examiner*—Chi H. Pham
*Assistant Examiner*—Khai Tran
*Attorney, Agent, or Firm*—Terry J. Anderson; Karl J. Hoch, Jr.

[57] ABSTRACT

A method for separating a desired signal from an interfering signal, which is particularly useful when the desired signal is substantially weaker than the interfering signal, includes the steps of providing a combined signal which contains both a desired signal and an interfering signal; performing a Fourier transform upon the combined signal; providing a reference function which is a function of the amplitude, frequency and phase of the interfering signal; performing a Fourier transform upon the referenced function; multiplying the real components of the Fourier transform of the combined signal by the real components of the Fourier transform of the reference signal to form a product; and subtracting the product from the Fourier transform of the combined signal to form transformed data less interference, i.e., the desired signal.

19 Claims, 1 Drawing Sheet

METHOD FOR SEPARATING A DESIRED SIGNAL FROM AN INTERFERING SIGNAL

FIELD OF THE INVENTION

The present invention generally comprises a method for removing a desired signal from noise and more particularly comprises a method for separating a desired signal from an interfering signal when the desired signal is weaker than the interfering signal.

BACKGROUND OF THE INVENTION

Methods for canceling or removing undesirable noise from a desired signal are well known. For example, a common analogue method for effecting such noise comprises simply subtracting the analogue noise signal from the combined desired and interfering signal. However, this technique is only useful when the precise interfering signal is known. Further, it is most effective when the interfering signal is substantially weaker than the desired signal.

Also known are a variety of techniques for digitally reducing the level of noise in a signal. Digital filtering techniques include the use of digital signal processing (DSP) hardware and software for reducing the amplitude of undesirable interfering filters having particular characteristics, such as those within a particular frequency band.

Such noise cancellation techniques are commonly used in digital communications and radar applications to reduce the level of hiss or background noise commonly associated with communication methodology and in radar applications to remove the broadcast radar signal which is inevitably present in the return signal. However, again such methodologies are particularly useful when the interfering signal is weaker than the desired signal.

However, in many instances the interfering signal is significantly stronger than the desired signal. This situation is common in radio communications, particularly spread spectrum radio communications wherein the signal may be transmitted over a substantial distance and thus comprises only a portion of its original amplitude at the site of the receiver. Further, as those skilled in the art will appreciate, spread spectrum techniques involve the use of extremely low level signals, typically having amplitudes comparable to that of background electrical noise.

In view of the foregoing, it would be desirable to provide a means for separating a desired signal from an interfering signal when the desired signal is weaker than the interfering signal.

SUMMARY OF THE INVENTION

The present invention specifically addresses and alleviates the above mentioned deficiencies associated with the prior art. More particularly, the present invention comprises a method for separating a desired signal from an interfering signal when the desired signal is substantially weaker than the interfering signal. The method comprises the steps of providing a combined signal comprising a desired signal and an interfering signal; performing a Fourier transform upon the combined signal; providing a reference function which is a function of the amplitude, frequency and phase of the interfering signal; performing a Fourier transform upon the reference signal; smoothing the Fourier transform data of the combined signal; multiplying the real components of the Fourier transform of the smoothed signal by the real components of the Fourier transform of the reference signal to form a product; and subtracting the product from the Fourier transform of the combined signal to form transformed data less interference.

More particularly, the method comprises the steps of providing a combined signal comprising a desired signal and an interfering signal; providing a clock signal having a frequency of Fc; sampling the combined signal with an analog to digital converter at the clock frequency Fc; storing the sampled combined signal in a data buffer; multiplying the stored combined signal by a weighting function to form a weighted combined signal; performing a Fourier transform upon the weighted combined signal; providing a reference function; multiplying the reference function by a weighing function to form a weighted reference function; performing a Fourier transform upon the weighted reference function to form a set of reference function coefficients; selecting a subset of the referenced function coefficients being selected such that the reference function is described within a predetermined frequency band; scaling the subset of reference function coefficients to unity; smoothing the Fourier transform data of the weighted combined signal with a smoothing function; multiplying a real portion of the scaled subset of the reference function coefficients by a real portion of the smooth and weighted combined signal and multiplying an imaginary portion of the scaled subset of the reference function coefficients by an imaginary portion of the smoothed and weighted combined signal to form a product; and subtracting the product from the smoothed and weighted combined signal to form transformed data less interference.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED INVENTION

Figure 1:
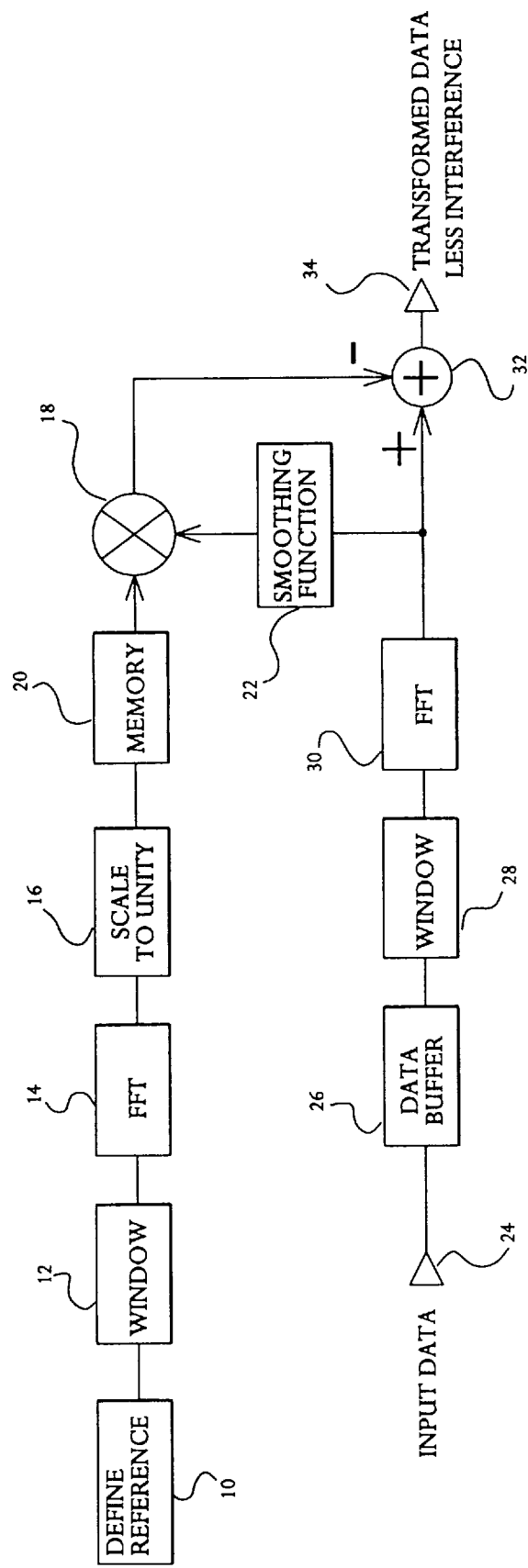
FIG. 1 is a block diagram of the method for separating a desired signal from an interfering signal of the present invention.

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood however, that the same or equivalent functions may be accomplished by different embodiments that are also intended to be encompassed within the spirit and scope of the invention.

The method for separating a desired signal from an interfering signal when the desired signal is weaker than the interfering signal is illustrated in FIG. 1 of the drawings, which depict a presently preferred embodiment thereof. Referring now to FIG. 1, the method generally comprises the steps of defining a reference function 10 modifying that reference function according to a window 12 as discussed in further detail below. Performing a Fourier transform, preferably a Fast Fourier Transform (FFT) 14 upon the reference signal. The transform reference signal is then scaled to unity 16 and the scaled transformed reference signal is stored 20 for later use.

Input data 24, comprising both the desired signal and the interfering signal is read into data buffer 26. The input data is then modified according to window 28, which, according to the preferred embodiment of the present invention, is identical to window 12, as discussed in further detail below. Next, the Fourier transformer, preferably a fast Fourier transform 30 is performed upon the input data. According to the preferred embodiment of the present invention, the Fourier transform is performed in an identical matter to that which is utilized in transforming the reference function. That is, the number of processing points is preferably the same for both fast Fourier transforms 14, 30.

Thus, according to the present invention, a method is provided for recovering weak signal in the presence of a strong interfering signal, using digital signal processing (DSP) techniques. The signal input, I(p), which represents the combined signal, is given by:

$$I(t) = \text{Iinterference}(t) + \text{Idesired}(t)$$

where:
Iinterference(t)=a*sin(wi*t+p)
Idesired(t)=b*sin(wc*t+q)
a>>b
wi≈wc

The present invention mitigates the intensity of the interfering signal without substantially distorting or disturbing the desired signal. In order for the present invention to perform optimally, it is necessary that the frequency of the interference (wi) be known and that it not change substantially with time, i.e., the interfering signal is stable. Further, the amplitude and phase of the interference (a) and (p) are unknown and change slowly overtime. Further, the frequency, phase and amplitude of the desired signal (wc, q, b) are unknown and change rapidly over time. When these criteria are met, then the present invention is very effective at removing the interfering signal, even when the interfering signal is substantially stronger than the desired signal.

The above listed criteria are found for example, in the radar receiver of a single antenna Doppler radar. In such Doppler radar applications, the receiver inherently has a small leakage or feedthrough from the transmitter. The feedthrough is an interfering signal, since it must be removed so as to accurately determine the desired parameters from the return radar signal. The feedthrough is also typically orders of magnitude stronger than the desired return signal and is generally very close in frequency to the desired return signal. For example, the feedthrough frequency at 24 GHz can be within 0.0000005% of the carrier for a target that is moving relative to the radar with a Doppler shift of 120 Hz. According to this example, the signal canceler must remove a substantial portion of the feedthrough signal without substantially distorting the desired return signal.

According to the present invention, this is accomplished with a software algorithm which may be run upon a general purpose microprocessor or a digital signal processing (DSP) microprocessor. The algorithm of the present invention preferably functions in a real time mode, thus requiring that the computer code utilized is both efficient and fast. As mentioned above, the present invention attenuates undesirable signals which meet the above listed criteria typically by more than 90 dB, while allowing very weak desired signals to remain substantially undistorted.

The input signal I(t) is typically provided by the output of a receiver, such as the down converted IF output of a radar receiver. However, those skilled in the art will appreciate that the present invention may be utilized in a variety of different applications. Discussion of the present invention for use with a radar receiver is by way of example only and not by way of limitation.

The interference is related to the clock frequency by the following formula:

$$wi = 2*\pi*Fc/n$$

where n=an integer, typically 3
Fc=clock frequency

I(t) is sampled by an analogue to digital converter (ADC) at clock frequency Fc. The sample data is stored in a data buffer and is then multiplied by an amplitude weighting function, which preferably comprises a Blackman-Harris window. The use of such windows is described in "ON THE USE OF WINDOWS FOR HARMONIC ANALYSIS WITH THE DISCRETE FOURIER TRANSFORM, Fredric J. Harris, *Proceedings of the IEEE*, Volume 66, No. 1, January 1978. This window amplitude function has 92 dB maximum side lobes and also has a steep fall off outside of the signal peak. The window minimizes the frequency overlap and distortion between the interference signal and the desired signal. The preferred window function is:

a0=0.35875
a1=0.48829
a2=0.14128
a3=0.01168
n=0
while (n++<=8192)
W[n]=I[n]*(a0−a1* cos(2*pi*(n−1)/8192)+a2*cos (4*pi*(n−1)/8192)−a3*cos(6*pi*(n−1)/8192))

The windowed data W[n] is preferably processed in a 8,192 point real fast Fourier transform (FFT). The fast Fourier transform transforms the input data from a time function to a frequency function, in a manner which is well known by those skilled in the art. The fast Fourier transform has 8,192 real and 8,192 imaginary values at positive and negative frequencies. The positive frequencies are identical to the negative frequencies except for a signed reversal. However, it is conventional to use just the positive frequencies of the transform. The useable outputs are thus 4,096 real and imaginary numbers which are FFT_data_real [ . . . ] and FFT_data_imaginary [ . . . ] The brackets [ ] indicate vectors and ' . . . ' the index.

A reference function R(t) is pre-computed at the interference frequency. The amplitude value depends on the ADC in the application. For example, 12 bit ADC means a_maximum is $2^{12}/2=2,048$, i.e., it is based on the number of bits used in the ADC.

$$R(t) = a\_maximum*sin(wi)$$

The signal processing steps of windowing and 8,192 point FFT are applied to the reference function. The outputs are FFT_reference_real [ . . . ] and FFT_reference_imaginary [ . . . ]. However, unlike previously when we used 4,096 outputs, only 10 outputs are needed in the reference. The indices are wi, 1 to 4 points above wi, and 1 to 5 points below we. The 10 points are all that are necessary to accurately describe the reference function in the frequency domain.

The 10 FFT_reference_real [ . . . ] and 10 FFT_reference_imaginary [ . . . ] are scaled to unity by dividing the real values by FFT_reference_real [wi] and by dividing the imaginary values by FFT_reference_imaginary [wi]. The results are stored in memory. This is more efficient than calculating the reference values for window, FFT, and unity scale for each set of input data.

The input data is smoothed at the frequency wi. Smoothing improves the estimate at wi by reducing the effects of noise. The smoothing formulas are:

smoothed_real=alpha*FFT_data_real [wi]+(1-alpha)*smoothed_real smoothed_imaginary=alpha*FFT_data imaginary [wi]+ (1alpha)*smoothed_imaginary The formulas are initialized by putting a measured value of FFT_data_real[wi] and FFT_data_imaginary [wi] in initial smoothed_real and initial smoothed_imaginary, respectively. The alpha coefficient is a constant between 0 and 1. It has a typical value of 0.3 for typical smoothing. The concept for smoothing that is used here, is similar to what is commonly known as an alpha-beta tracker. However, in this application, as shown in the above smoothing formulas, the beta coefficient is not used and in this discussion the degree of smoothing depends only on the alpha coefficient.

Next, the 10 FFT_reference_real[ . . . ] are multiplied by smoothed_real and the 10 FFT_reference_imaginary [ . . . ] and multiplied by smoothed_imaginary. The reference results are subtracted in real time from FFT_data_real[ . . . ] and FFT_data_imaginary [ . . . ] where the indices are identical between reference and input data. This process removes the interference signal from the input data, and it leaves the desired signal (s) for further processing. This completes the algorithm.

One disadvantage of the present invention is that it removes the desired signal if its frequency is the same as the interference signal. In the radar example, this algorithm eliminates all zero Doppler signals, including the interfering feedthrough but also desired target signals at zero Doppler. The advantage is that it passes signals that are very close in frequency to the interference, even signals that are only a few Hertz away, while attenuating >90 dB of the interference. The method is limited to passing signals that differ from the interference frequency by at least one FFT bin.

Optionally, the transformed input data is smoothed 22 using an alpha coefficient that is other than 0.3 so as to improve the estimate of the amplitude and phase of the interfering signal. In some applications the alpha coefficient is set to unity so smoothing is turned off, and that is an effective approach when there are rapid changes in the amplitude or phase of the interfering signal.

It is understood that the exemplary method for separating a desired signal from an interfering signal described herein and shown in the drawings represents only a presently preferred embodiment of the invention. Indeed, various modifications and additions may be made to such embodiment without departing from the spirit and scope of the invention. For example, various other transformers may be utilized and are considered equivalent to the Fourier transform. Thus, as used herein, the terms Fourier transform and fast Fourier transform are defined to include all similar transforms, such as Laplace transforms, which transform signal data from a time domain to a frequency domain or the like. Further, those skilled in the art will appreciate that the present invention may find application in many different areas. Use of the present invention in a radar receiver is thus by way of example only, and not by way of limitation. Thus, these and other modifications and additions may be obvious to those skilled in the art may be implemented to adapt the present invention for use in a variety of different applications.

What is claimed is:

1. A method for separating a desired signal from an interfering signal when the desired signal is weaker than the interfering signal, the method comprising the steps of:

a) providing a combined signal comprising a desired signal and an interfering signal;
b) providing a clock signal having a frequency of Fc;
c) sampling the combined signal with an analog to digital converter at the clock frequency Fc;
d) storing the sampled combined signal in a data buffer;
e) multiplying the stored combined signal by a weighting function to form a weighted combined signal;
f) performing a Fourier transform upon the weighted combined signal;
g) providing a reference function;
h) multiplying the reference function by a weighting function to form a weighted reference function;
i) performing a Fourier transform upon the weighted reference function to form a set of reference function coefficients;
j) selecting a subset of the reference function coefficients, the subset of the reference function coefficients being selected such that the reference function is described within a predetermined frequency band;
k) scaling the subset of reference function coefficients to unity;
l) multiplying a real portion of the scaled subset of the reference function coefficients by a real portion of the transformed data of the weighted combined signal and multiplying an imaginary portion of the subset of the reference function coefficients by an imaginary portion of the transformed data of the weighted combined signal to form a product; and
m) subtracting the product from the transformed data of the weighted combined signal to form transformed data less interference.

2. The method for separating a desired signal from an interfering signal as recited in claim 1, wherein the step of providing a clock signal comprises providing a clock signal having a clock frequency related to the frequency of the interfering signal by the formula:

wi=2*pi*Fc/n where: wi is the frequency of the interfering signal;
Fc is the clock frequency;
n is an integer.

3. The method for separating a desired signal from an interfering signal as recited in claim 1, wherein n is equal to 3.

4. The method for separating a desired signal from an interfering signal as recited in claim 1, wherein the step of multiplying the combined signal by a weighting function comprises multiplying the combined signal by a Blackman-Harris window.

5. The method for separating a desired signal from an interfering signal as recited in claim 1, wherein the step of multiplying the combined signal by a weighting function comprises multiplying the combined signal by a Blackman-Harris window having an amplitude function comprising 92 dB maximum side lobes.

6. The method for separating a desired signal from an interfering signal as recited in claim 1, wherein the step of multiplying the combined signal by a weighting function comprises multiplying the combined signal by a Blackman-Harris window according to the following formula:

W[n]=I[n]*(a0-a1*cos(2*pi*(n-1)/8192)+a2*cos(4*pi*(n-1)/8192)-a3 *cos(6*pi*(n-1)/8192))

where:
- a0=0.35875;
- a1=0.44829;
- a2=0.14128;
- a3=0.01168;
- n=0; and
- n++<=8192.

7. The method for separating a desired signal from an interfering signal as recited in claim 1, wherein the step of performing a Fourier transform upon the weighted combined signal comprises performing an 8, 192 point Fast Fourier Transform.

8. The method for separating a desired signal from an interfering signal as recited in claim 1, wherein the step of providing a reference function comprises computing a reference function according to the formula:

$$R(t) = a\_maximum * sin(wi)$$

where: wi is the frequency of the interfering signal; and a_maximum is the maximum amplitude that is based on the number of bits used in the application in the analog to digital converter.

9. The method for separating a desired signal from an interfering signal as recited in claim 1, wherein:
a) the step of sampling the combined signal comprises sampling the combined signal with a 12 bit analog to digital converter; and
b) the step of providing a reference function comprises computing a reference function according to the formula:

$$R(t) = a\_maximum * sin(wi)$$

where: wi is the frequency of the interfering signal; and a_maximum is the maximum amplitude of the interfering signal.

10. The method for separating a desired signal from an interfering signal as recited in claim 1, wherein the combined signal and the reference function are multiplied by the same weighting function.

11. The method for separating a desired signal from an interfering signal as recited in claim 1, wherein the step of performing a Fourier transform upon the weighted reference function comprises performing an 8, 192 point Fast Fourier Transform.

12. The method for separating a desired signal from an interfering signal as recited in claim 1, wherein the step of selecting a subset of the reference function coefficients comprises selecting 10 reference function coefficients, the 10 reference function coefficients being wi, 1 to 4 points above wi, and 1 to 5 points below wi where wi is the interfering signal's radian frequency.

13. The method for separating a desired signal from an interfering signal as recited in claim 1, wherein the step of scaling the subset of reference function coefficients to unity comprises dividing a real component of the reference function coefficients by a real component at the interfering frequency wi and dividing imaginary components of the reference function coefficients by an imaginary component at the interfering frequency wi.

14. The method for separating a desired signal from an interfering signal as recited in claim 1, further comprising the step of storing the subset of reference function coefficients in a memory.

15. The method for separating a desired signal from an interfering signal as recited in claim 1, further comprising the step of smoothing the transformed data of the weighted combined signal.

16. The method for separating a desired signal from an interfering signal as recited in claim 1, further comprising the step of smoothing the transformed data of the weighted combined signal according to the following formulas:

smoothed_real=alpha*FFT_data_real[wi]+(1-alpha)*smoothed_real; and smoothed imaginary_=alpha*FFT_data_imaginary[wi]+(1-alpha)*smoothed_imaginary.

17. The method for separating a desired signal from an interfering signal as recited in claim 1, further comprising the steps of:
a) smoothing the transformed data of the weighted combined signal according to the following formulas:
smoothed_real=alpha*FFT_data_real[wi]+(1-alpha)*smoothed_real;
smoothed_imaginary=alpha*FFT_data_imaginary[wi]+(1-alpha)*smoothed_imaginary;
where alpha is a constant between 0 and 1; and
b) initializing the smoothing formulas of step (a) by using previously measured values of FFT_data_real[wi] and FFT_data imaginary[wi] as initial values of smoothed_real and smoothed_imaginary, respectively.

18. The method for separating a desired signal from an interfering signal as recited in claim 1, further comprising the steps of:
a) smoothing the transformed data of the weighted combined signal according to the following formulas:
smoothed_real=alpha*FFT_data_real[wi]+(1-alpha)*smoothed_real;
smoothed imaginary=alpha*FFT_data_imaginary[wi]+(1-alpha)*smoothed_imaginary;
where alpha is 0.3; and
b) initializing the smoothing formulas of step (a) by using previously measured values of FFT_data_real[wi] and FFT_data_imaginary[wi] as initial values of smoothed_real and smoothed_imaginary, respectively.

19. A method for separating a desired signal from an interfering signal, the method comprising the steps of:
a) providing a combined signal comprising a desired signal and an interfering signal;
b) performing a Fourier transform upon the combined signal;
c) providing a reference function which is a function of the amplitude and frequency and phase of the interfering signal;
d) performing a Fourier transform upon the reference function to form a set of reference function coefficients;
e) selecting a subset of the reference function coefficients, the subset of the reference function coefficients being selected such that the reference function is described within a predetermined frequency band;
f) scaling the subset of reference function coefficients to unity;
g) multiplying the real and imaginary components of the Fourier transform of the combined signal by the real and imaginary components of the Fourier transform of the subset of reference function coefficients to form a product; and
h) subtracting the product from the Fourier transform of the combined signal to form the transformed data less interference.

* * * * *